July 2, 1963 H. J. McCREARY 3,096,402

TELEPHONE LINE CONCENTRATOR

Filed March 10, 1960 4 Sheets-Sheet 1

INVENTOR.
Harold J. Mc Creary
BY C. A. Gulbrandsen
Atty.

July 2, 1963 H. J. McCREARY 3,096,402

TELEPHONE LINE CONCENTRATOR

Filed March 10, 1960 4 Sheets-Sheet 2

INVENTOR.
Harold J. McCreary

BY C. A. Gulbrandsen
Atty.

TELEPHONE LINE CONCENTRATOR

Filed March 10, 1960 4 Sheets-Sheet 3

INVENTOR.
Harold J. McCreary
BY
C. A. Gulbrandsen
Atty.

INVENTOR.
Harold J. McCreary
BY C. A. Gullbrandsen
Atty.

3,096,402

TELEPHONE LINE CONCENTRATOR

Harold J. McCreary, Canoga Park, Calif., assignor to Automatic Electric Laboratories, Inc., Northlake, Ill., a corporation of Delaware Filed Mar. 10, 1960, Ser. No. 14,061
11 Claims. (Cl. 179—18)

This invention relates in general to telephone systems and more particularly to line concentrators for use in telephone systems.

An object of this invention shall be to provide an improved line concentrator for use in a telephone system providing equal access by a number of telephone stations to a lesser number of trunks to a telephone central office.

One feature of this invention is the use of permanent magnetic material as a switching information storage element. A second feature is the use of electromagnets as transmission path selecting devices. A third feature shall be the inclusion of improved circuitry to reverse the polarity of electromagnets used as transmission path selecting devices, to use them as transmission path disconnecting devices. A fourth feature is the provision of circuitry incorporating storage devices that require no electrical power. A fifth feature shall be the provision of switching devices including permanent magnets in their structure as means for connecting telephone lines to telephone trunks. A sixth feature shall be the provision of reversible permanent magnets as means for controlling the connecting switches. A seventh and final feature shall be the use of permanent magnets in the structure of the connecting switches as detectors for determining the state of other permanent magnets used as storage elements and to operate the switching mechanisms in accordance with this information.

Figure 1:
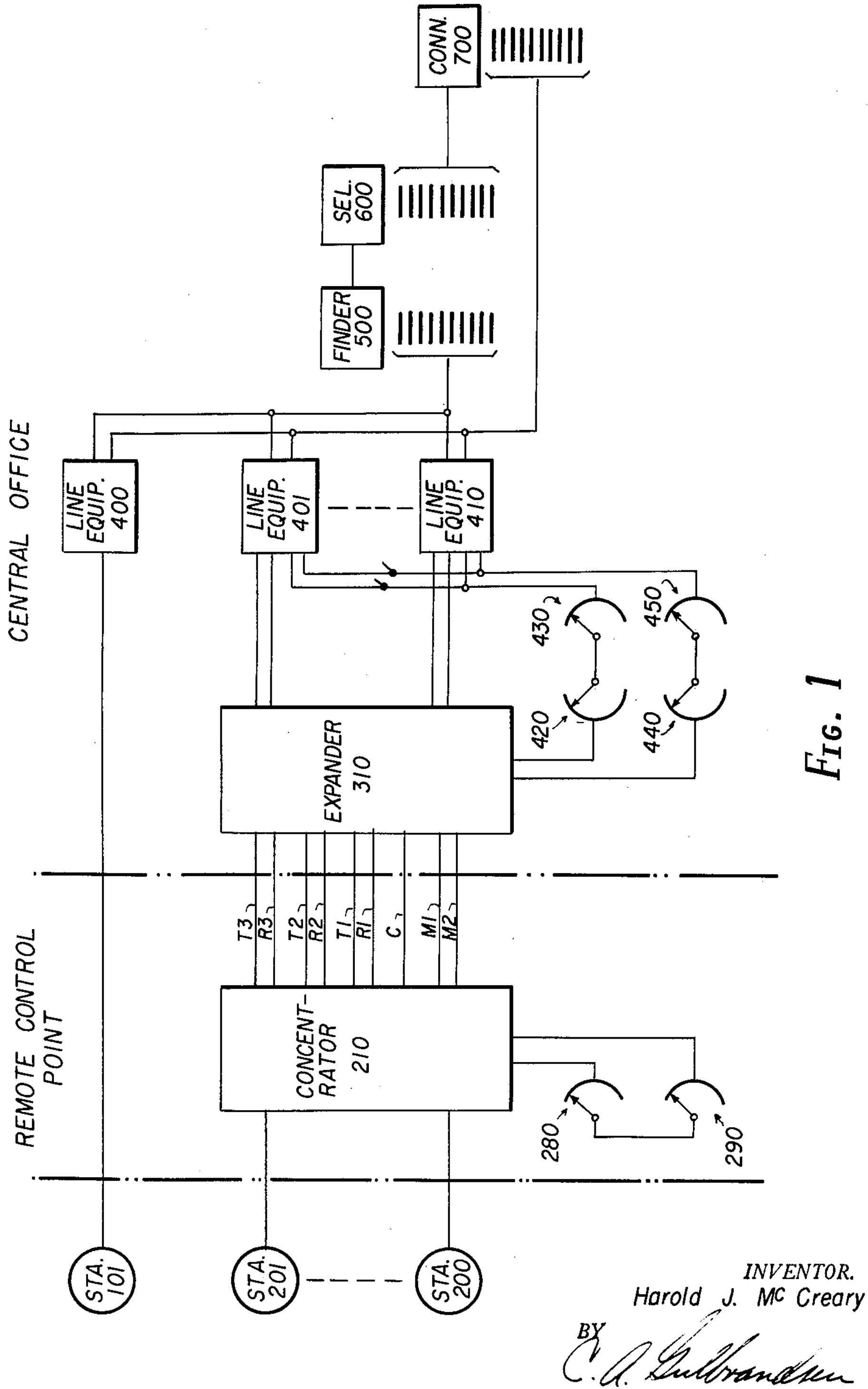
Figure 2:
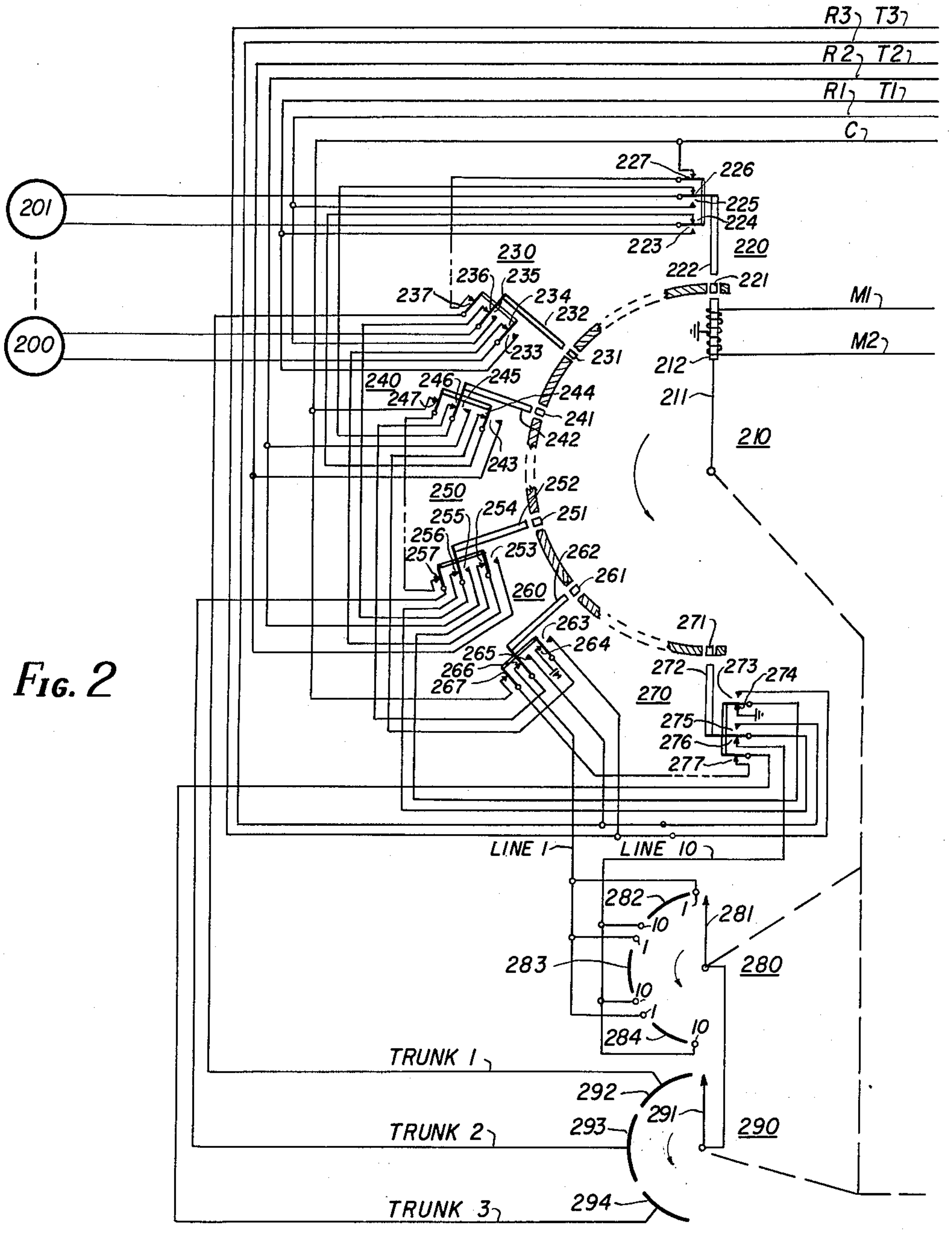
Figure 3:
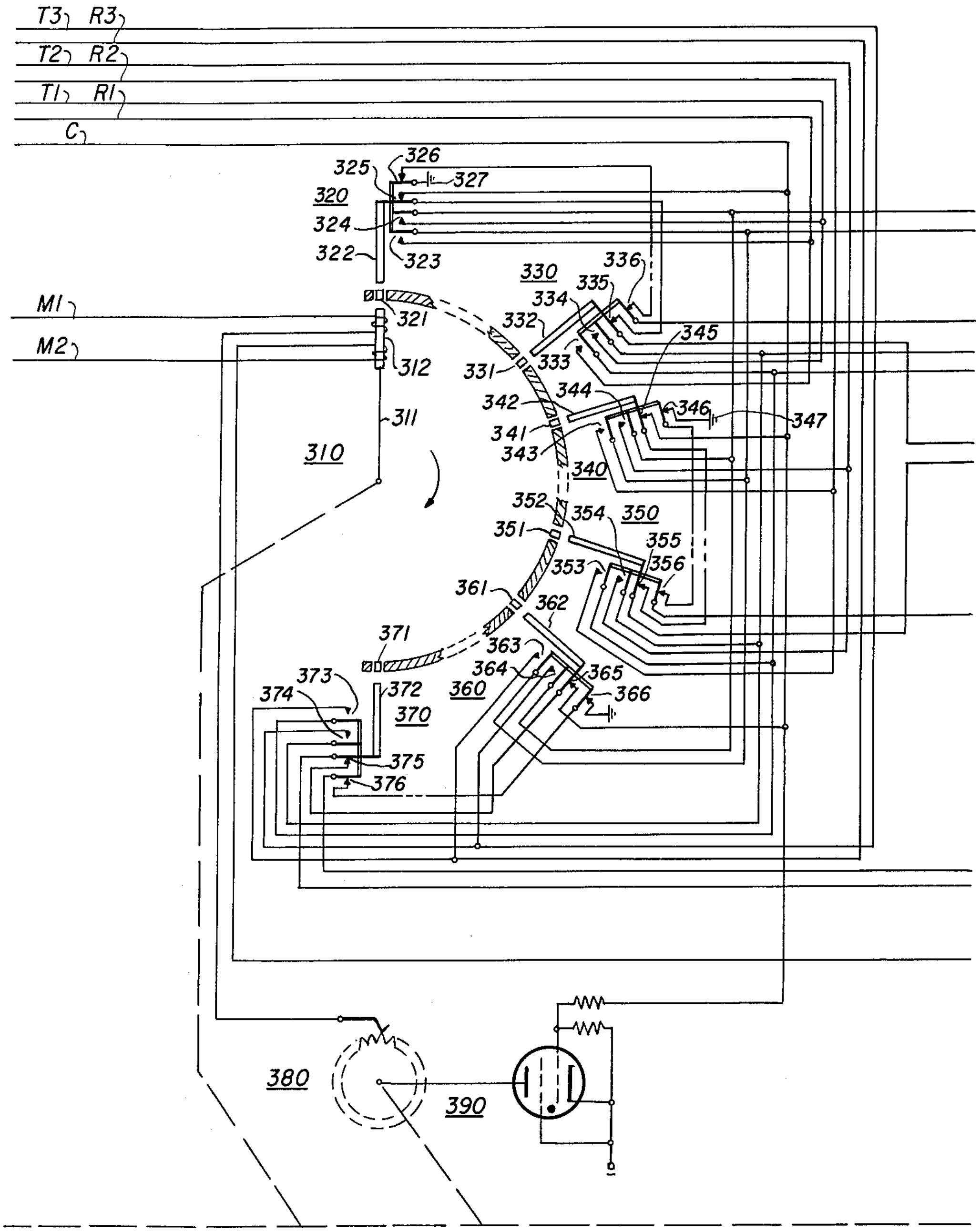
Figure 4:
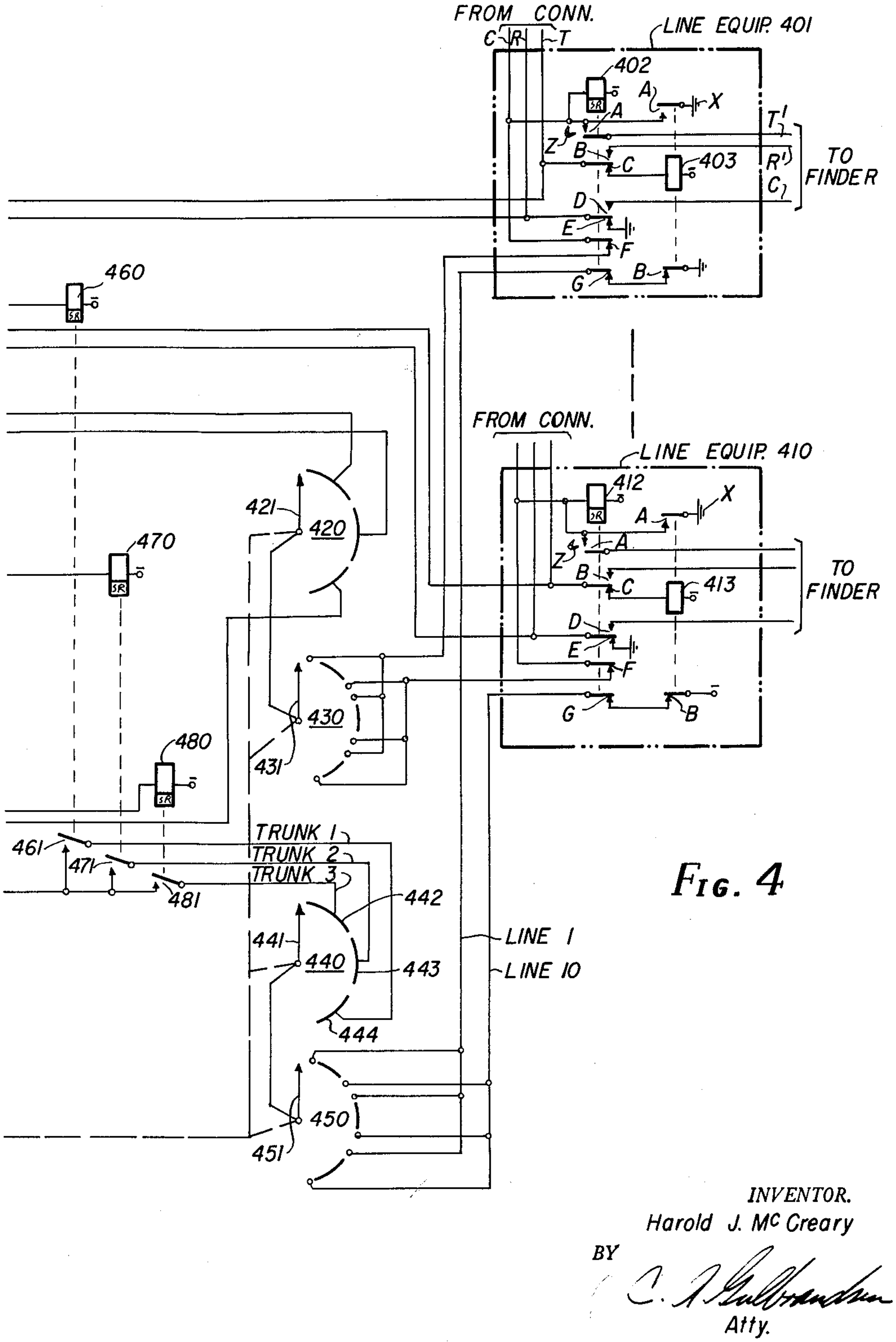

FIGURE 1 is a functional diagram of a telephone system including line concentrating facilities. FIGURE 2 is a schematic diagram of the line concentrator facilities located at the remote control point. FIGURE 3 is a schematic diagram of a portion of the line expander facilities located at the central office. FIGURE 4 is a schematic diagram of a portion of the line expander facilities and associated line equipment located at the central office.

Referring to FIGURE 1 the telephone exchange shown is of the well known Strowger or step-by-step type employing conventional circuitry wherein during normal operation removal of the subscriber's handset from the hook switch at a substation 101 is detected by a line finder 500. Extension of a connection to the selector 600 after dialling of a first digit causes the call to be extended over the selector banks to the connector which upon reception of the final two dialled digits extends the telephone call to a called station.

When a subscriber 201 who is served by line concentrator facilities removes the handset from the hook ground is extended through contacts in concentrator switch 210 to a thyratron associated with expander switch 310 at the central office. Magnetizing coils associated with expander switch 310 and concentrator switch 210 are actuated to reverse the polarity of appropriate storage magnets included in the concentrator switch and the expander switch, so that the associated detector magnets cause the switching circuitry to operate to extend the connection from the calling substation 201 over one of available trunk circuits to the associated line equipment 401 located at the central office.

The concentrator switch 210 and rotary switches 280 and 290 of FIG. 2 are driven by a common mechanism, ratchet mechanism, synchronous motor, etc., as are the expander switch 310 and rotary switches 420, 430, 440 and 450. The mechanisms located at the remote control point and at the central office may be of any well known type and are synchronized so that corresponding bank contacts and storage magnets are accessed at both ends at the same time. The concentrator switch shown in the instant embodiment provides facilities for 30 switching circuits each circuit, i.e., 220 consists of a storage magnet, i.e., 221, a detecting magnet, i.e., 222 and connected to each detecting magnet a spring combination, i.e., 223 to 227. Each spring combination enables one telephone line to be connected to one of the trunks to the central office. Thus it is apparent that in order to give each station access to all three trunks provided in this embodiment a total of thirty switch circuits must be provided. The first rotary switch 280 at the remote location has thirty sets of bank contacts arranged on a multiple basis so that the first, eleventh and twenty-first contacts are in multiple, second, twelfth and twenty-second contacts, etc., and ultimately the tenth, twentieth and thirtieth contacts are in multiple. The wipers 281 of this switch are connected to the wipers 291 of the second rotary switch 290 which also includes thirty sets of bank contacts. However in the case of the second rotary switch the first ten contacts 292 are strapped together, the second ten 293, are strapped together and the third ten 294 are strapped together. It is apparent in the foregoing arrangement that as the wipers rotate on rotary switches 280 and 290 and the magnetizing coil arm 211 in the concentrator switch rotates, concentrator switch circuit number 1, line circuit number 1 and the first contact of trunk circuit group number 1 are positioned together at the same time. As the synchronous mechanism operating the rotary switches and the concentrator switch operates each of these continue to step providing in the case of the first rotary switch 280 access to one line after the other going through the sequence from 1 to 10 and then repeating. Rotary switch 290 provides trunk access by 10 continuous steps to contacts multiplied for trunk 1, a second ten steps for trunk 2 and a third ten steps for trunk 3. In the concentrator switch the first switching circuit is identified as a combination of line 1 and trunk 1, the second line 2 trunk 1, the third line 3 trunk 1 and so on with the final combination being indicative of line 10 trunk 3. The switching points shown in FIGURE 2 are indicative of line 1 trunk 1, line 10 trunk 1, line 1 trunk 2, line 10 trunk 2, line 1 trunk 3, line 10 trunk 3. This same arrangement is repeated for the expander switch 310 located at the central office.

A detailed description of the placing of a telephone call through line concentrator facilities embodied in this invention are best understood by taking FIGURES 2, 3 and 4 in combination.

A subscriber 201 removes his handset from the hook to complete the loop circuit extending from ground 268 over contact 264, to contact 244 of switch 240, to contact 224, the hook switch of substation 201, contact 226 of switch 220, contact 246 of switch 240 and contacts 266 of switch 260 to multiple bank contacts numbered one on rotary switch 280. Wiper 281 upon rotation comes into contact with any contact designated one further extending the circuit to wiper 291 of rotary switch 290. Assuming now the trunk circuit to be used in this instance is trunk number 1 the ground is further extended over any of the strapped bank contacts designated trunk 1, 292 from there to contacts 237 on switch 230 over contact 227 of switch 220 to control conductor C. This conductor extends to the central office and to the grid of thyratron 390. Thyratron 390 is so biased that when the aforementioned circuit from ground is completed thyratron 390 conducts, extending a potential over interrupter 380 to the upper windings on magnetizing coil 312 at the central office and magnetizing coil 212 at the remote control point and ultimately to the associated ground. This potential is effective to energize magnetizing coils 212 at the remote location and 312 in the central office to reverse the polarity of the storage magnets 221 and 321 to attract detecting magnets 222 and 322. Normally the storage magnets are poled to repel the detector magnets. The motion of magnet 222 towards magnet 221 operates the associated switch contacts 223 to 227 to connect station 201 over contacts 223 and 225 to trunk conductor T1 and R1 respectively in the cable between the remote location and the central office.

At the central office end the action of magnetizing coil 312 to reverse the polarity of storage magnet 321 attracts detecting magnet 322 to extend conductors T1 and R1 over contacts 324 and 323 respectively to line equipment 401.

In line equipment 401 conductor R1 is connected to ground X over spring contact E of relay 402 and conductor T1 to line relay 403 over contact C. Relay 403 is connected to battery. Since a complete loop now extends from ground at the central office through the substation at the remote point back to the central office and to relay 403, this relay now operates extending ground over its contact A to slow-to-release relay 402 causing it to operate. At the same time operation of relay 403 removes battery from contact B preparing the release circuit. The operation of relay 402 extends the talking pair T1 and R1 over contact B and contact D respectively to the line finder 500 shown in FIGURE 1. Relay 402 now locks to ground extended in any well known manner over conductor C from the associated connector switch 700 of FIGURE 1. By virtue of the above recited sequence of events substation 201 is now connected over conductors T1 and R1 of trunk 1 to its associated line equipment 401. Upon dialling the subscriber at substation 201 now causes the switch train to step through to its normal sequence of operations and to be connected to a desired party in any well known manner.

When the line is released by a subscriber hanging up, both cutoff relay 402 and line relay 403 are released. Release of the trunk is accomplished by the following sequence of events. Battery flows from negative battery over contact B of relay 403 through contact G of relay 402 over one of the bank contacts designated 1 in rotary switch 450, over wiper 451 to wipers 441 of rotary switch 440 over one of the bank contacts designated trunk 1, 442 through contacts 481 of relay 480 to the lower winding of coil 312, ultimately over control conductor M2 to the lower winding of coil 212 at the remote control point, and thence to the associated ground. This action reverses the polarity of storage magnets 221 and 321 respectively so that their respective detector magnets 222 and 322 are repelled placing their associated contacts in a released position thus releasing the concentrator switch 210 and the expander switch 310 from the trunk conductors extending between remote control point and central office.

In the case of an incoming call from the central office to one of the lines served by the line concentrator facilities, a connector would establish a connection to the conductors T, R and C since no ground would exist on conductor C. Again using station 201 as the line desired by the calling subscriber, the connector would extend ground over conductor C in any well known manner to busy the line, and subsequently operate cutoff relay 402. Line relay 403 remains unoperated. Upon the operation of cutoff relay 402 mechanical interlock Z prevents the cutoff relay line contact A being closed through to a local finder or selector and tying up such equipment. The ground over the C lead from the connector bank is extended through contact F of the cutoff relay to one of the bank contacts designated 1 on rotary switch 430 over wiper 431 to wiper 421 of rotary switch 420 over one of the number 1 group of multipled bank contacts on rotary switch 420 associated with trunk number 1 through contacts 335 of switch 330 to contacts 325 of switch 320 extended from this point to the grid of thyratron 390 to initiate firing of the thyratron as in the aforementioned recited sequence of events. Thyratron 390 fires causing the magnetizing coils to reverse the polarity of the storage magnets to attract the detecting magnets and operate the associated switching contacts to establish a connection between the calling subscriber and called station 201. At the remote control point the operation of concentrator switch 210 and rotary switches 280 and 290 is similar to that previously described in connection with the placement of a call by station 201.

Inasmuch as the concentrator equipment at the remote control point and the expander equipment in the central office are similar the switching operations may be considered minor images of each other with similar switching steps occurring at both points simultaneously.

What is claimed is:

1. In a telephone system a plurality of lines each including at least one station, a central office including a plurality of line equipments each corresponding to a different one of said lines, and line concentration equipment for the establishment of circuit connections between a plurality of said line and said corresponding line equipments comprising: a plurality of trunks less in quantity than said lines; line concentrating means located at a point remote to said central office including line terminations and trunk terminations and switching means including a plurality of bistable permanent magnets operated in response to one stable state to connect at least one of said trunk terminations to at least one of said line terminations; and line expanding means located at said central office including line equipment terminations, trunk terminations, and switching means including a plurality of bistable permanent magnets operated in response to one stable state to connect at least one of said trunk terminations to at least one of said line equipment terminations.

2. In a telephone system as claimed in claim 1, wherein: said line concentrating means includes an electromagnet; a driving mechanism to selectively position said electromagnet adjacent to one of said plurality of bistable permanent magnets to operate said permanent magnet to one stable state; and said line expanding means includes an electromagnet; a driving mechanism to selectively position said electromagnet adjacent to one of said plurality of bistable permanent magnets to operate said magnet to one stable state; and synchronizing means whereby said driving mechanisms include in said line concentrating means and said line expanding means each simultaneously positioning their associate electromagnet.

3. In a telephone system as claimed in claim 1; wherein said line concentrating means include: a plurality of bistable information storage magnets, a plurality of monostable detecting permanent magnets each individually positioned adjacent to a different one of said storage magnets and each having attached thereto a plurality of switching contacts; at least one reversible electromagnet adapted to be positioned adjacent to any one of said plurality of information storage magnets and operative to reverse the polarity of said information storage magnet to attract said adjacent detector magnet to operate said attached switching contacts.

4. In a telephone system as claimed in claim 1, wherein said line expanding means include: a plurality of bistable information storage magnets, a plurality of monostable detecting permanent magnets each individually positioned adjacent to a different one of said storage magnets and each having attached thereto a plurality of circuit switching contacts; at least one reversible electromagnet adapted to be positioned adjacent to any one of said plurality of information storage magnets and operative to reverse the polarity of said information storage magnet to attract said adjacent detector magnet to operate said attached switching contacts.

5. In a telephone system a plurality of lines each including at least one station, a central office including a plurality of line equipments each corresponding to a different one of said lines, and line concentration equipment for the establishment of circuit connections between a plurality of said lines and said corresponding line equipments comprising: a plurality of trunks less in quantity than said lines; line concentrating means located at a point remote to said central office, including line terminations, trunk terminations, and switching means including a plurality of bistable permanent magnets operated in response to one stable state to connect at least one of said trunk terminations to at least one of said line terminations; and line expanding means located at said central office.

6. In a telephone system as claimed in claim 5, wherein said line concentrating means includes: an electromagnet; a driving mechanism for selectively positioning said electromagnet adjacent to one of said plurality of bistable permanent magnets; to operate one of said permanent magnets to one stable state.

7. In a telephone system, a plurality of lines each including at least one station, a central office including a plurality of line equipments each corresponding to a different one of said lines, and line concentration equipment for the establishment of circuit connections between a plurality of said lines and corresponding line equipments comprising: a plurality of trunks less in quantity than said lines; line concentrating means located at a point remote to said central office; and line expanding means located at said central office including line equipment terminations, trunk terminations, and switching means including a plurality of bistable permanent magnets operated in response to one stable state to connect at least one of said trunk terminations to at least one of said line equipment terminations.

8. In a telephone system as claimed in claim 7, wherein said line expanding means includes: an electromagnet; a driving mechanism for selectively positioning said electromagnet adjacent to one of said plurality of bistable permanent magnets to operate said bistable permanent magnet to one stable state.

9. In a telephone system a plurality of lines each including at least one station, a central office including a plurality of line equipments each corresponding to a different one of said lines, and line concentration equipment for the establishment of circuit connections between a plurality of trunks less in quantity than said lines; line concentrating means located a point remote to said central office including line terminations, trunk terminations, and switching means including a plurality of bistable information storage permanent magnets, a plurality of monostable detecting permanent magnets each individually positioned adjacent to a different one of said storage magnets, and each having attached thereto a plurality of switching contacts, at least one reversible electromagnet; a driving mechanism for positioning said electromagnet adjacent to any one of said plurality of information storage magnets; said electromagnet operative to reverse the polarity of said information storage magnet to attract said adjacent detector magnet, to operate said attached switching contacts; means operated responsive to the initiation of a call over one of said lines to operate said electromagnet; and line expanding means located at said central office.

10. In a telephone system a plurality of lines each including at least one station, a central office including a plurality of line equipments each corresponding to a different one of said lines, and line concentration equipment for the establishment of circuit connections between a plurality of said lines and said corresponding line equipments comprising: a plurality of trunks less in quantity than said lines; line concentrating means located at a point remote to said central office; and line expanding means located at said central office including line equipment terminations, trunk terminations and switching means including a plurality of bistable information storage permanent magnets, a plurality of monostable detecting permanent magnets each individually positioned adjacent to a different one of said storage magnets and each having attached thereto a plurality of switching contacts, at least one reversible electromagnet; a driving mechanism for positioning said electromagnet adjacent to any one of said plurality of information storage magnets; said electromagnet operative to reverse the polarity of said information storage magnet to attract said adjacent detector magnet to operate said attached switching contacts; and means operated responsive to the initiation of a call over one of said lines to operate said electromagnet.

11. In a telephone system, a plurality of lines each including at least one station, a central office including a plurality of line equipments each corresponding to a different one of said lines, and line concentration equipment for the establishment of circuit connections between a plurality of said lines and corresponding line equipments comprising: a plurality of trunks less in quantity than said lines; line concentrating means located at a point remote to said central office including line terminations, trunk terminations, and switching means including a plurality of bistable information storage permanent magnets, a plurality of monostable detecting permanent magnets each individually positioned adjacent to a different one of said storage magnets and each having attached thereto a first plurality of switching contacts having connections to said line terminations and a second plurality of switching contacts having connections to said trunk terminations, at least one reversible electromagnet operable to reverse the polarity of said information storage magnet to attract said adjacent detecting magnet to operate said attached switching contacts to connect at least one of said trunk terminations to at least one of said line terminations, and a driving mechanism for positioning said electromagnet adjacent to anyone of said plurality of information storage magnets; line expanding means located at said central office including line equipment terminations, trunk terminations and switching means including a plurality of bistable information storage permanent magnets, a plurality of monostable detecting permanent magnets each individually positioned adjacent to a different one of said storage magnets and each having attached thereto a first plurality of switching contacts having circuit connections to said line equipment terminations and a second plurality of switching contacts having circuit connections to said trunk terminations, at least one reversible electromagnet operable to reverse the polarity of said information storage magnet to attract said adjacent detecting magnet to operate said attached switching contacts to connect at least one of said trunk terminations to at least one of said line equipment terminations, and a driving mechanism for positioning said electromagnet adjacent to anyone of said plurality of information storage magnets; synchronizing means whereby said driving mechanism included in said line concentrating means and said driving mechanism included in said line expanding means each simultaneously position their associated electromagnets; and means operated responsive to the initiation of a call over one of said lines to operate said electromagnet included in said line concentrating means and said electromagnet included in said line expanding means.

References Cited in the file of this patent

UNITED STATES PATENTS

| | | |
|---|---|---|
| 2,715,658 | Dunlap | Aug. 16, 1955 |
| 2,916,557 | Fleckenstein | Dec. 8, 1959 |